(12) United States Patent
Yamaguchi

(10) Patent No.: US 6,710,321 B2
(45) Date of Patent: Mar. 23, 2004

(54) DISPLAY IMAGE QUALITY MEASURING SYSTEM

(75) Inventor: Akira Yamaguchi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/401,561

(22) Filed: Mar. 31, 2003

(65) Prior Publication Data

US 2003/0183748 A1 Oct. 2, 2003

(30) Foreign Application Priority Data

Mar. 29, 2002 (JP) .......................... 2002-098115

(51) Int. Cl.$^7$ .............................................. H01L 27/00
(52) U.S. Cl. ............................ 250/208.1; 250/214 P; 358/3.27
(58) Field of Search ..................... 250/208.1, 214 P; 358/3.27; 348/239, 344; 396/125

(56) References Cited

U.S. PATENT DOCUMENTS

| | | | | |
|---|---|---|---|---|
| 4,473,288 A | * | 9/1984 | Onodera et al. | ............ 396/234 |
| 5,051,770 A | * | 9/1991 | Cornuejols | ................... 396/125 |
| 6,246,494 B1 | * | 6/2001 | Tatsumi | ...................... 358/522 |

* cited by examiner

Primary Examiner—Kevin Pyo
Assistant Examiner—Seung C Sohn
(74) Attorney, Agent, or Firm—Sughrue Mion, PLLC

(57) ABSTRACT

The display image quality measuring system includes a image pickup device with a photographing condition, a gradation characteristic and a dark level being known, a control device for instructing a display to display an adjustment pattern and a measurement pattern and an analyzing device. The displayed adjustment pattern is photographed and a measurement photographing condition is determined by the analyzing device using the photographing data, the photographing condition, the gradation characteristic and the dark level. The displayed measurement pattern is photographed under the determined measurement photographing condition and the photographing data of the measurement pattern is analyzed.

7 Claims, 3 Drawing Sheets

FIG.4A
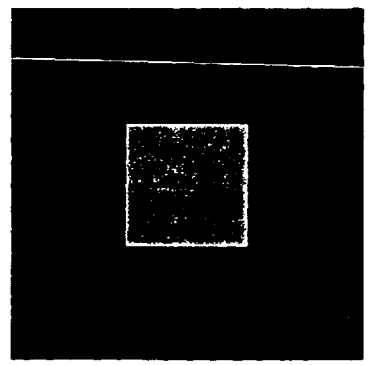
FIG.4B  FIG.4C  FIG.4D  FIG.4E  FIG.4F
  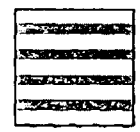  
FIG.5
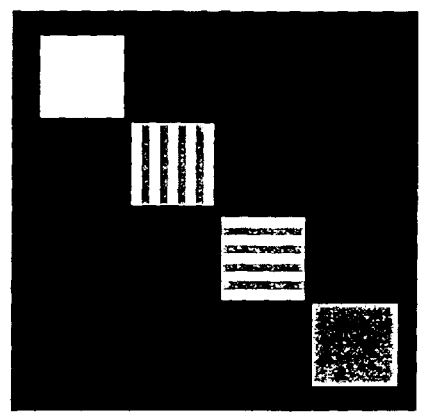

DISPLAY IMAGE QUALITY MEASURING SYSTEM

BACKGROUND OF THE INVENTION

1. Field of the Invention

The present invention belongs to a technical field of image display. In particular, the present invention relates to a display image quality measuring system capable of easily evaluating the image quality of a display by a commercial image pickup device of a conventional type such as a digital camera without using a measuring device such as a microdensitometer.

2. Description of the Related Art

A diagnostic image taken by a medical measurement apparatus such as an MRI diagnostic apparatus, an X-ray diagnostic apparatus, or an FCR (Fuji computed radiography) is generally recorded in a translucent image recording film such as an X-ray film, a film photosensitive material, or the like, and reproduced as a translucent image. The film in which the diagnostic image is reproduced is set in a lighting system which is called Schaukasten and observed with a state in which the film is irradiated with light from its rear side so that a diagnosis is conducted.

In contrast to this, in recent years, a diagnostic image taken by a medical measurement apparatus is displayed on a display such as a CRT (cathode ray tube) or an LCD (liquid crystal display device) and observed to conduct a diagnosis (electronic Schaukasten).

When a diagnosis is conducted using an image reproduced in a film, the image is, so to speak, a fixed one. Although there is a certain difference resulting from luminance of Schaukasten and an observation environment, the same image is basically observed so that a diagnosis can be conducted.

However, when a diagnosis using a display image (hereinafter referred to as a display diagnosis) is conducted, what is fixed is image data, and a displayed image, that is, a diagnostic image varies according to the kind, the state, the change over time, or the like of the display. Such a variation in image raises a serious problem in which wrong diagnosis may be caused. Therefore, when the display diagnosis is conducted, the quality control (QC) of a display is important to keep the state of the display appropriate.

For example, when a deterioration of luminance is caused in a CRT by a change over time, or the like, an output of electron beam is enhanced to restore luminance. Now, according to such a luminance correction method, the luminance is restored. However, the beam size of the electron beam becomes larger according to the enhancement of the output. As a result, the sharpness of an image is reduced.

In a conventional method, whether the sharpness of a display is appropriate or not is determined by visual observation. However, according to such a method, the sharpness cannot be evaluated quantitatively.

On the one hand, when the sharpness of a display is quantitatively evaluated, for example, there is required a measurement method of photographing a displayed image in a film and measuring the image by a microdensitometer with respect to its sharpness, which consumes time and uses technical equipment. It is extremely difficult to conduct the quality control of the display for which such measurement is required in the location where a display is used, such as a hospital.

SUMMARY OF THE INVENTION

An object of the present invention is to solve the above problems of the prior art, and therefore to provide a display image quality measuring system capable of easily and quantitatively measuring the image quality of a display for displaying such images as a medical image for diagnosis using a commercial image pickup device of a conventional type such as a digital camera without using a dedicated technical device for measurement such as a microdensitometer which is expensive.

In order to attain the object described above, the present invention provides a display image quality measuring system comprising:

image pickup means for conducting photographing which includes a two dimensional solid state sensor and an imaging optical system, with a photographing condition in which a gradation characteristic is not saturated, a gradation characteristic under the photographing condition, and a dark level being known;

control means for instructing a display to display an adjustment pattern and a measurement pattern; and analyzing means for analyzing photographing data obtained by the image pickup means, wherein the display is instructed to display the adjustment pattern, the adjustment pattern thus displayed is photographed by the image pickup means, photographing data of the adjustment pattern is supplied to the analyzing means, and a measurement photographing condition is determined by the analyzing means using the photographing data, the photographing condition, the gradation characteristic, and the dark level, and wherein the display is instructed to display the measurement pattern, the measurement pattern thus displayed is photographed by the image pickup means under the determined measurement photographing condition, photographing data of the measurement pattern is supplied to the analyzing means, and the photographing data of the measurement pattern is analyzed by the analyzing means.

Preferably, the photographing data is corrected using the dark level, and when the photographing data is color photographing data, the photographing data is converted into monochrome photographing data and then determination of the measurement photographing condition and analysis of the photographing data are conducted.

And, preferably, the image pickup means is a digital camera.

And, preferably, parameters in the photographing condition are an exposure time, a diaphragm value, and photographing sensitivity.

Further, preferably, when sharpness of the display is measured, the display is instructed to display as the measurement pattern solid images of two kinds of luminance and high frequency images in which straight lines of the two kinds of luminance extending in a direction orthogonal to a sharpness measurement direction are alternately arranged for every K pixels (K is an integer of 1 or higher) in the measurement direction, photographing data of the high frequency images are averaged in the direction orthogonal to the measurement direction to compute a first profile of each of the high frequency images in the measurement direction, moving average processing is conducted for the first profile of each of the high frequency images to compute a second profile of each of the high frequency images, and the sharpness of the display is measured using average values of relative maximum peaks and average values of relative minimum peaks in the second profiles obtained by the moving average processing and average values of the photographing data of the solid images.

And, preferably, the adjustment pattern and the measurement pattern are identical.

Further, preferably, when sharpness of the display is measured, in one or both of the adjustment pattern and the measurement pattern, a solid image of low luminance, a solid image of high luminance, a high frequency image in which a line of the high luminance and a line of the low luminance each extending in an H-direction are alternately arranged for every K pixels (K is an integer of 1 or higher) in a V-direction, and a high frequency image in which a line of the high luminance and a line of the low luminance each extending in the V-direction are alternately arranged for every K pixels (K is an integer of 1 or higher) in the H-direction are displayed on one screen, and the high frequency images are arranged in a central portion of a region to be photographed by the image pickup means, the solid images are arranged outside the central portion, and the respective images are arranged such that any of the images does not exist in a region of another image extended in the H-direction and the V-direction.

BRIEF DESCRIPTION OF THE DRAWINGS

In the accompanying drawings;

FIGS. 4A and 4B show examples of the adjustment pattern in the display image quality measuring system of the present invention and FIGS. 4C to 4F show examples of the measurement pattern therein; and FIG. 5 is a conceptual diagram showing an example of the pattern used for sharpness measurement in the display image quality measuring system of the present invention.

DETAILED DESCRIPTION OF THE PREFERRED EMBODIMENTS

Hereinafter, a display image quality measuring system of the present invention will be described in detail with reference to the preferred embodiments shown in the accompanying drawings.

Figure 1A:
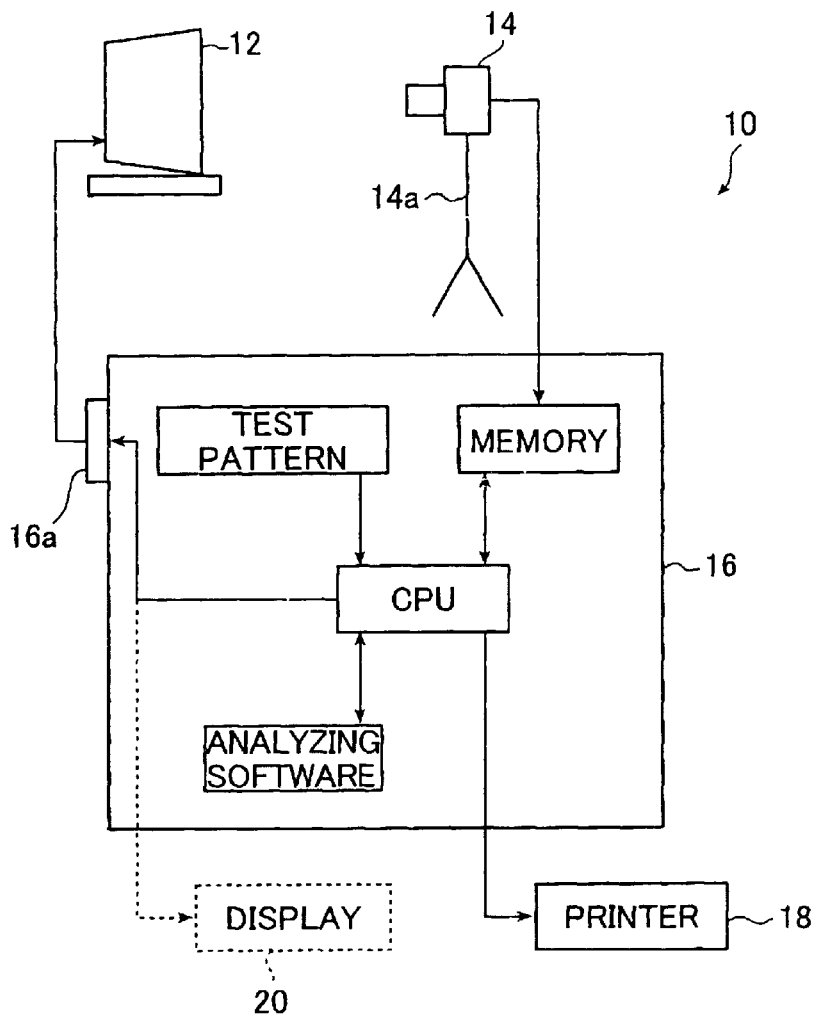
FIGS. 1A and 1B are conceptual diagrams each showing an example of the display image quality measuring system of the present invention.

FIG. 1A is a conceptual diagram showing an example of the display image quality measuring system of the present invention.

A display image quality measuring system 10 shown in FIG. 1A (hereinafter referred to as the measuring system 10) is used for measuring the image quality of a display 12 and basically constructed to include a digital camera 14 and a computer 16.

Note that, in the present invention, a display as a subject for image quality measurement is not particularly limited. Thus, the present invention is suitably applicable to image quality measurement of various displays such as a CRT (cathode ray tube), an LCD (liquid crystal display device), and a plasma display device.

The digital camera 14 (hereinafter referred to as the camera 14) is a known digital camera (CCD camera or CMOS camera). The camera 14 may be any image pickup device including a consumer digital camera and a digital camera for use in science, for example, astronomy, as long as the photographing condition in which the gradation characteristic is not saturated, the gradation characteristic under such photographing condition, and the dark level (output signal at photographing with the luminance of 0), which are described later, are known.

The consumer digital camera generally uses a CCD sensor or a CMOS sensor as a sensor and outputs color photographing data of 8 bits. A relationship between the luminance of an object and output signals (image data) is non-linear.

On the other hand, the scientific digital camera generally uses a CCD sensor as a sensor and outputs monochrome photographing data. There is also the case where it is cooled to reduce a noise. The scientific digital camera is of a low noise type and has a high bit resolution such as a 14-bit resolution. However, the scientific digital camera has sensitivity in an infrared region in many cases so that it is necessary to attach an infrared absorption filter thereto in photographing. Further, it is preferable that a luminosity correction filter is also attached. Thus, a relationship between the luminance of an object and output signals can be made linear.

A camera having a pixel size on the order of 3 $\mu$m to 15 $\mu$m is preferable as the camera 14. In addition, the number of pixels is preferably no less than 1000 pixels×1000 pixels. Further, it is preferable that a macro lens is used as a photographing lens.

Note that, in the display image quality measuring system of the present invention, image pickup means is not limited to the digital camera 14 as the example shown in the drawing. Any of various image pickup means including an image pickup means specifically used for the display image quality measuring system of the present invention may be used as long as it includes a two dimensional solid state sensor (two dimensional solid state image pickup element) such as an area CCD sensor and an imaging optical system for forming an image of a measurement subject (object of photographing) on the sensor, and the photographing condition in which the gradation characteristic is not saturated, the gradation characteristic under such photographing condition, and the dark level are known.

The computer 16 (hereinafter referred to as the PC 16) is a general personal computer or work station which is composed to have a CPU, a memory, and the like.

In the present invention, the PC 16 operates as a means for displaying an adjustment pattern and a measurement pattern (hereinafter these patterns are sometimes referred to collectively as a test pattern) and a means for analyzing photographing data. Also, the PC 16 is equipped with image data of the test pattern, image analyzing software for conducting image quality measurement as described later, and the like.

Further, the PC 16 stores the photographing condition in which the gradation characteristic of the camera 14 described above is not saturated, the gradation characteristic under such photographing condition, and the dark level with respect to the camera 14.

The camera 14 and the PC 16 are connected with each other through a known interface such as a grabber board, USB, or, IEEE 1394. In addition, the PC 16 and the display 12 are connected with each other through known means using, for example, a video board 16a.

Further, an output printer 18 may be connected with the PC 16 as in a general personal computer. Further, a display 20, in addition to the display 12 as an image quality measurement subject, may be connected therewith.

Note that, in the measuring system 10 as the example shown in the drawing, the camera 14 and the PC 16 are connected with each other and various kinds of processing are automatically conducted online. However, the present invention is not limited to this. The image quality measurement of the display 12 may be conducted offline in which the camera 14 and the PC 16 are not connected with each other.

In this time, photographing data obtained by the camera 14 may be stored in a recording medium such as SmartMedia™ or CompactFlash™ card and supplied to the PC 16. In addition, in this time, instead of prephotographing (photographing of the adjustment pattern) which is described later, a measurement condition may be set using a luminance meter.

Figure 2:
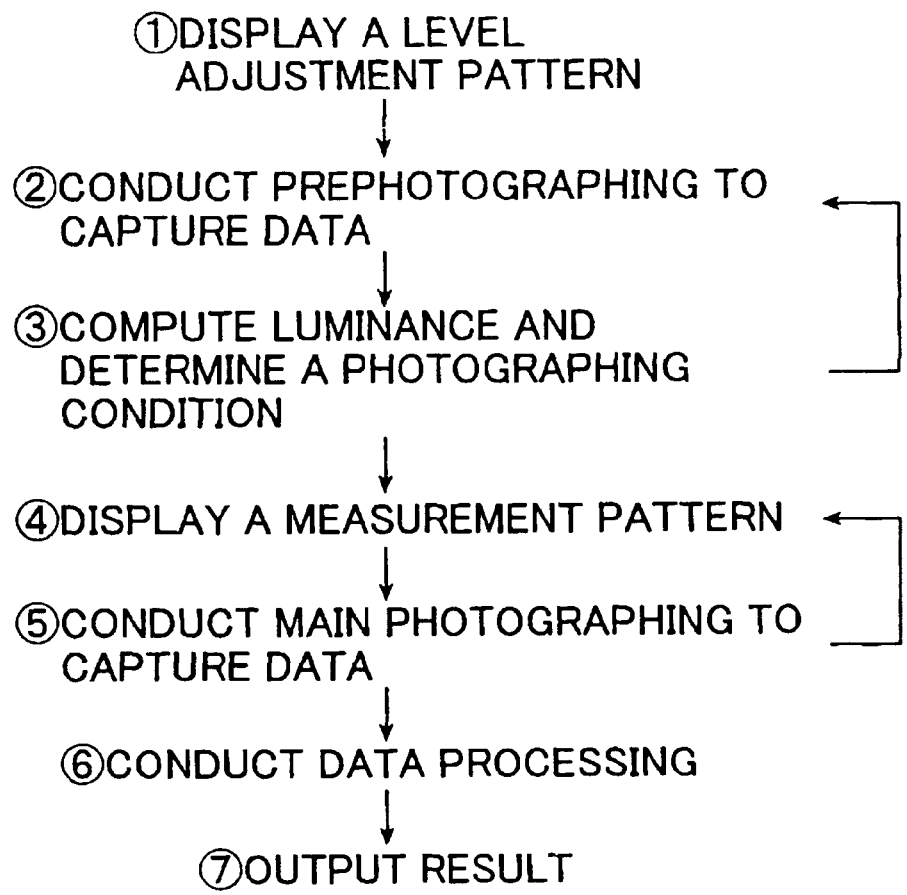
FIG. 2 is a flow chart for explaining the display image quality measuring system of the present invention.

In the measuring system 10 of the present invention, the image quality measurement of the display 12 is basically conducted as shown in FIG. 2.

(1) First, the PC 16 instructs the display 12 to display a level adjustment pattern (the adjustment pattern as above).

(2) Next, the level adjustment pattern is photographed by the camera 14 (prephotographing), and then photographing data is transferred to the PC 16 and captured therein.

(3) The PC 16 analyzes the photographing data obtained by the prephotographing, computes the luminance of the level adjustment pattern, and determines the photographing condition (photographing condition of main photographing).

(4) The PC 16 instructs the display 12 to display the measurement pattern.

(5) The measurement pattern is photographed by the camera 14 (main photographing), and then photographing data is transferred to the PC 16 and captured therein.

(6) The PC 16 processes (analyzes) the photographing data obtained by the main photographing.

(7) A result is outputted.

In the present invention, it is preferable that the prephotographing and the main photographing are automatically conducted according to the display of the test pattern under the control of, for example, the PC 16.

Further, it is preferable that the adjustment of the photographing condition of the camera 14 in the prephotographing and the main photographing is automatically conducted as in the above case.

When the output of the camera 14 is saturated during the prephotographing, the condition is changed and the prephotographing (2) and the data analysis (3) are conducted again. In addition, when appropriate prephotographing is not conducted even if such operation is repeated the predetermined number of times, a message indicating the occurrence of an error may be outputted to cease the processing. Further, when the luminance of the level adjustment pattern is too high, an ND filter may be attached for conducting photographing.

Also, as in sharpness measurement which is described later, the measurement pattern display (4) and the main photographing (5) may be repeated the necessary number of times according to the measurement item. In addition, in some cases, the level adjustment pattern display (1) and the prephotographing (2) may be repeated plural times.

In such a measuring system of the present invention, when high precision image quality measurement is to be conducted, it is preferable that photographing is conducted under a magnification M in which 8×8=64 or more pixels of an image pickup element (for example, a CCD sensor) of the camera 14 correspond to one pixel of the display 12 (in other words, it is preferable that oversampling of 8 times or more is conducted). For example, when the size of one pixel of the display 12 is 200 $\mu$m×200 $\mu$m and the size of one pixel of the camera 14 is 10 $\mu$m×10 $\mu$m, 200M/10≧8, that is, M≧0.4. Thus, it is preferable that the photographing is conducted under a magnification of 0.4 or more. When a macro lens is used, up to life-size shot can be generally made with less aberration. Therefore, this example is reasonable even in such a point.

Also, when luminance measurement of the display 12 as described later is to be appropriately conducted, photographing is preferably conducted with a state in which a room light is turned off and/or the display 12 is light-shielded from the outside using a blackout curtain. Further, it is preferable that photographing is conducted using a tripod 14a.

Here, before giving the description of a specific example, luminance computation in the prephotographing, which is one of features of the present invention, and setting of the photographing condition of the main photographing will be described.

Exposure E of the (digital) camera 14, that is, of such a sensor as a CCD, is basically determined according to the brightness of an object (object luminance) L, the exposure time (shutter speed) t, the diaphragm value f, and the photographing sensitivity S (even a digital camera has the photographing sensitivity corresponding to the ISO sensitivity of a film in general) and expressed by the following equation:

$$L \times t \times S/f^2 = E.$$

Also, in the camera 14, in the case of the same exposure E, the same photographing (image) data x should be obtained. That is, $$x = g(L \times t \times S/f^2) = g(E) = g(kL).$$

In the present invention, with respect to the camera 14 constituting the system, the photographing condition (exposure time, diaphragm value, and photographing sensitivity) in which the gradation characteristic is not saturated and the gradation characteristic of the camera 14 under such photographing condition are examined in advance using a luminance meter, and both are stored in the PC 16 (analyzing means) (hereinafter, for the sake of convenience, the photographing condition and the gradation characteristic thus stored are assumed as the basic photographing condition and the basic gradation characteristic, respectively).

Figure 3:
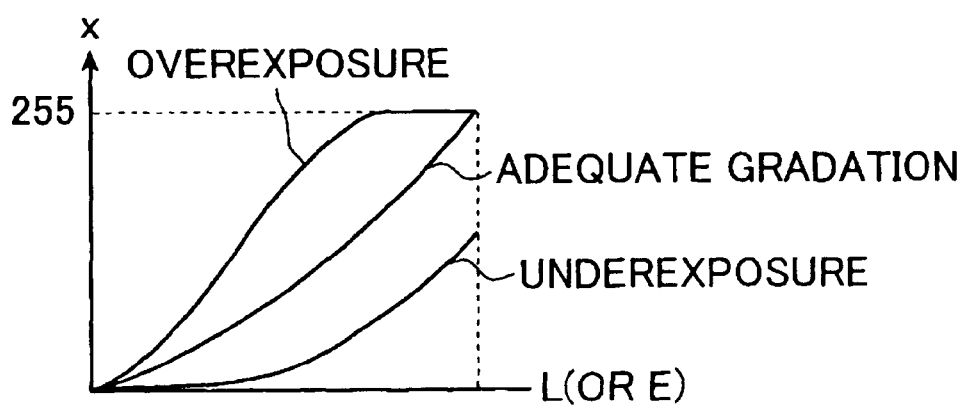
FIG. 3 is a graph for explaining the display image quality measuring system of the present invention.

To be more specific, the basic photographing condition is set such that neither overexposure nor underexposure is effected and the gradation characteristic is not saturated over the entire range of photographing data x (that is to say, if the photographing data is of 8-bit, it is effectively used over its entire range from data 0 to data 255), as is the case with an adequate gradation shown in FIG. 3, for example. Then, the relationship between the luminance L and the photographing data x under the basic photographing condition thus set, namely the basic gradation characteristic, is examined and the basic photographing condition and the basic gradation characteristic are both stored in the PC 16.

Under the basic photographing condition as above, when the exposure time, the diaphragm value and the photographing sensitivity are set as $t_0$, $f_0$ and $S_0$, respectively, from the above-mentioned equation, $$x_i = g(L_i \times [(t_0 \times S_0)/f_0^2])$$

is obtained. This curve represents the basic gradation characteristic of the camera 14.

The basic photographing condition may be determined as appropriate according to characteristics of the camera 14, and the like.

However, displaying on the display 12 is carried out on the basis of frames (in the case of 60 Hz, one frame is continued for 0.0167 seconds). Thus, in order to conduct adequate measurement, it is required that the exposure time $t_0$ is set to be obtained by an integration of a plurality of frames in the basic photographing condition. Conversely, when the exposure time is set too long, the influence of a noise component of a sensor becomes larger, which is not preferable. In consideration of the above points, the exposure time is preferably set to about 0.1 seconds to 0.5 seconds.

Here, there is the case where, with respect to such photographing data, the dark level is superposed on an output signal according to the characteristics of the camera 14. In other words, there is the case where dark level data $x_{dark}$ is superposed on the photographing data. At this time, it is preferable that the dark level data $x_{dark}$ is stored in the PC 16 and then the PC 16 conducts photographing data processing on the photographing data x obtained by subtracting the dark level data $x_{dark}$ from photographing raw data $x_0$ captured by the camera 14. That is, in the case of monochrome photographing, $$x_0 = x_0 - x_{dark}$$

and in the case of color photographing, $$x_R = x_{0R} - x_{dark},$$

$$x_G = x_{0G} - x_{dark}, \text{ and}$$

$$x_B = x_{0B} - x_{dark}.$$

The dark level depends on a dark current and a thermal noise of a sensor. In addition, the dark level data $x_{dark}$ can be measured by photographing with a state in which a shutter is closed or a state in which a lens cap is put on (that is, a state in which no light is incident). Note that, of course, it is preferable that the dark level data $x_{dark}$ is measured for each pixel of the camera 14 and corrected. However, in such a case, a burden on signal processing is large. In addition, correction using an average value of the dark level data $x_{dark}$ of all pixels is actually sufficient.

In a consumer digital camera, signal processing is conducted such that the dark level data $x_{dark} = 0$. In a scientific digital camera, such processing is not conducted in many cases so that the above-mentioned correction is particularly effective.

Further, when color photographing is conducted by the camera 14, three kinds of photographing data, that is, photographing data $x_R$ corresponding to red, photographing data $x_G$ corresponding to green, and photographing data $x_B$ corresponding to blue are outputted. At this time, it is preferable that the PC 16 converts color photographing data into monochrome photographing data (luminance data) and conducts photographing data processing.

As an example of a method of converting the color photographing data into the monochrome photographing data, a method using the following equation is indicated. Thus, as in a standard of a television, the color photographing data can be converted into the monochrome photographing data in consideration of luminosity. That is, $$x = 0.299 x_R + 0.587 x_G + 0.114 x_B.$$

Note that the subtraction of the dark level data $x_{dark}$ from the photographing raw data $x_0$ and the conversion of the color photographing data into the monochrome photographing data in the PC 16 may be conducted in a conventional manner using a computer or the like.

Photographing data obtained at a time when the display 12 is photographed in a photographing condition a (exposure time $t_a$, photographing sensitivity $S_a$, and diaphragm value $f_a$) by the camera 14 having the basic gradation characteristic of "$x_i = g(L_i \times [(t_0 \times S_0)/f_0^2])$" as described above is assumed as $x_a$. The photographing data $x_a$ is applied to the above-mentioned basic gradation characteristic so that $x_a = x_i$ is set.

Both data are captured with the same exposure E ($E_i = E_a$). Thus, $$L_i \times [(t_0 \times S_0)/f_0^2] = L_a \times [(t_a \times S_a)/f_a^2], \text{ or}$$

$$L_a = L_i \times [(t_0 \times S_0 \times f_a^2)/(t_a \times S_a \times f_0^2)].$$

In other words, if the photographing condition a at photographing of the display 12 is known (naturally, one can know the condition because photographing is conducted by itself), luminance $L_a$ of the display 12 is computed from the basic gradation characteristic and the basic photographing condition of the camera 14 which have been obtained in advance.

As described later, in the present invention, patterns of the same luminance are basically displayed in the prephotographing and the main photographing. Thus, it is preferable that photographing data of the main photographing corresponding to the luminance $L_a$ of the display is in the vicinity of the midpoint of the entire range of the image data as much as possible.

With respect to the luminance $L_a$, when the photographing data x is to be made to desired photographing data $x_j$, the photographing condition of the main photographing, that is, the exposure time $t_b$, the photographing sensitivity $S_b$ and the diaphragm value $f_b$ for the main photographing may be set using the equation and the basic gradation characteristic as described above such that $$L_j \times [(t_0 \times S_0)/f_0^2] = L_a \times [(t_b \times S_b)/f_b^2], \text{ or}$$

$$(t_0 \times S_0 \times f_b^2)/(t_b \times S_b \times f_0^2) = L_a/L_j.$$

In other words, if a luminance meter is used to find in advance the basic photographing condition and the basic gradation characteristic under such condition with respect to the camera 14, the display luminance of the display 12 can be found using no luminance meter but the camera 14 and, in addition, an optimum photographing condition of the main photographing can be determined by conducting prephotographing one time.

Hereinafter, graininess measurement of the display 12 will be described as an example of image quality measurement of a display using the measuring system 10 of the present invention.

As described above, first, the PC 16 instructs the display 12 to display a level adjustment pattern. A pattern in which a rectangular solid image with middle gradation (middle luminance) is displayed in a central portion of the black background (of the minimum luminance) as shown in FIG. 4A is indicated as an example of the level adjustment pattern for graininess measurement.

Next, in prephotographing, the central solid image is photographed under a life-size magnification by the camera 14, and then photographing data is transferred to the PC 16 and captured therein.

At this time, the prephotographing condition is not particularly limited. However, preferably, the exposure time t is about 0.1 seconds to 0.5 seconds and the diaphragm value f is increased (stop-down is made) in order to increase the depth of field.

As described above, when the photographing data x of the prephotographing is received, the PC 16 computes the luminance L of the solid image using the photographing condition of the prephotographing as well as the basic photographing condition and the basic gradation characteristic of the camera 14.

Note that, for example, when the photographing data x is saturated, the photographing condition is changed and the prephotographing is conducted again. In addition, when the photographing condition of the camera 14 in the prephotographing has been adjusted by an operator, information on the photographing condition is transferred from the camera 14 to the PC 16 or the photographing condition of the prephotographing is inputted to the PC 16 by the operator.

As described above, before such computation of the luminance L (photographing data processing), when the camera 14 has the dark level, the photographing data x is obtained by subtracting the dark level data $x_{dark}$ from photographing raw data $x_0$ captured by the camera 14. In addition, when the camera 14 is a camera for color photographing, photographing data of three primary colors are converted into monochrome photographing data (luminance data) using the above-mentioned conversion equations, and arithmetic operation is conducted using the monochrome photographing data.

Such photographing data processing as above is performed similarly on the main photographing data in the graininess measurement and data (both the prephotographing data and the main photographing data) obtained in the sharpness measurement as described below. Therefore, the explanation of the photographing data processing is omitted in the following description.

Next, as described above, the photographing condition (exposure time t, photographing sensitivity S, and diaphragm value f) of the main photographing is set such that the photographing data obtained at a time when photographing by the camera 14 for the luminance L is conducted is of a value in the vicinity of the midpoint of the photographing data x (for example, around 127 in the case where the photographing data is of 8-bit). Note that, even in the photographing condition of the main photographing, it is preferable that the exposure time t is about 0.1 seconds to 0.5 seconds and the diaphragm value f is increased.

After the photographing condition of the main photographing is determined, the PC 16 instructs the display 12 to display a measurement pattern. Note that, in the graininess measurement, the measurement pattern may be the same as the level adjustment pattern.

Next, the central solid image is photographed in the determined photographing condition by the camera 14 to conduct the main photographing, and then photographing data is transferred to the PC 16 and captured therein.

After the photographing data x of the measurement pattern is captured, the PC 16 converts the photographing data x into luminance data L using $$E=g^{-1}(x)=kL, \text{ or}$$

$$L=1/k \times g^{-1}(x)$$

which is led from $$x=g(L \times t \times S/f^2)=g(E)=g(kL).$$

Note that the conversion is required because a relationship between the photographing data x of the camera and the luminance data L is non-linear.

The PC 16 analyzes the graininess of the display 12 using the luminance data L. Note that the analyzing may be conducted as in graininess measurement for image quality evaluation of a general display.

For example, the PC 16 conducts statistical processing and Fourier transform of the luminance data L to obtain RMS and Wiener spectrum. Thus, the graininess of the display 12 can be quantitatively measured.

Next, the PC 16 instructs the display 12 (or another display 20) to display the measurement result and/or the printer 18 to output it as a hard copy.

Next, sharpness measurement of the display 12 using the measuring system 10 will be described.

As in the case of the graininess measurement, first, the PC 16 instructs the display 12 to display a level adjustment pattern. A pattern in which a rectangle image as shown in FIG. 4B is displayed in a central portion of the black background as shown in FIG. 4A is indicated as an example of the level adjustment pattern for sharpness measurement. The image in FIG. 4B is composed of a solid image of a high luminance (low density) corresponding to a high luminance in rectangular patterns described later in one half and a solid image of a low luminance (high density) corresponding to a low luminance in rectangular patterns described later in the other half.

Next, prephotographing is conducted by the camera 14. Basically, the prephotographing may be conducted as in the graininess measurement. Thus, it is preferable that the exposure time t is about 0.1 seconds to 0.5 seconds and the diaphragm value f is increased.

Note that, in the present invention, the level adjustment pattern for the sharpness measurement and the prephotographing are not limited to those described above. The prephotographing may be conducted two times by displaying the low luminance solid image and the high luminance solid image on the black background in succession.

After receiving the photographing data and the photographing condition of the prephotographing, the PC 16 computes the luminance of the low density solid image and the high density solid image as described above. Next, the photographing condition of the main photographing is set from the luminance computation result such that the vicinity of the midpoint of photographing data meets the vicinity of the middle luminance between the low and high luminances computed.

Note that, when the photographing data of the high luminance solid image is saturated or when the photographing data of the low luminance solid image becomes flat, the level adjustment pattern is displayed, the photographing condition is changed, and the prephotographing is conducted again.

After the photographing condition of the main photographing is determined, the PC 16 instructs the display 12 to display a measurement pattern for sharpness measurement, the main photographing is conducted by the camera 14, and photographing data is captured in the PC 16. Note that, even in the photographing condition of the main photographing, it is preferable that the exposure time t is about 0.1 seconds to 0.5 seconds and the diaphragm value f is increased.

Four kinds of measurement patterns in total are indicated as examples of the measurement pattern for sharpness measurement, each of which has the black background similar to that of the patterns as described before and a rectangle image displayed in the central portion thereof, that is, a rectangle image having a high luminance line and a low luminance line which are extended in a V (vertical)-direction and alternately arranged for every pixel [that is, K=1 (K is an integer of 1 or higher)] as shown in FIG. 4C [H (horizontal)-direction CTF pattern of Nyquist frequency]; a rectangle image having a high luminance line and a low luminance line which are extended in the H-direction and alternately arranged as shown in FIG. 4D (V-direction CTF pattern); a solid rectangle image of a high luminance as shown in FIG. 4E; or a solid rectangle image of a low luminance as shown in FIG. 4F. Note that, in any measurement pattern, the low luminance and the high luminance are the same as the low luminance and the high luminance in the solid images of the level adjustment pattern, respectively.

In the main photographing, display of the measurement pattern and the main photographing are alternately conducted to obtain four photographing data of the main photographing in total.

Note that, when the measurement of CTF (contrast transfer function) of a frequency other than Nyquist frequency ($f_N$) is attempted, it is preferable that the CTF is measured at a frequency of $f_N/K$ corresponding to K pixels (K is an integer of 1 or higher) set as appropriate.

After photographing data of the respective measurement patterns are captured, the PC 16 converts the photographing data into luminance data as in the graininess measurement and analyzes the sharpness of the display 12. Note that the analysis may be conducted by a general method used in the sharpness measurement in image quality evaluation of a display.

According to an example, with respect to the H-direction CTF pattern first, averaging in the V-direction is carried out to obtain an H-direction (measurement direction) profile of the pattern. Further, averages of peaks (relative maximum peaks and relative minimum peaks) in the profile are computed as the values $H_{high}$ and $H_{low}$, respectively. Next, with respect to the V-direction CTF pattern, averaging in the H-direction is carried out and the values $V_{high}$ and $V_{low}$ are similarly computed. Further, the average luminance $A_{high}$ of the high luminance solid image and the average luminance $A_{low}$ of the low luminance solid image are computed (they become DC components).

Here, in the present invention, in order to conduct higher precision measurement, it is preferable that the values $H_{high}$, $H_{low}$, $V_{high}$, and $V_{low}$ of the two CTF patterns are computed using the following method in which the moving average processing is conducted.

According to the method, the adverse effect of noise can be reduced so as to conduct the sharpness measurement with high precision, which is effective particularly when the display 12 has a matrix structure as is the case with an LCD.

When the display 12 has a matrix structure, an extremely low luminance portion is caused in a pixel which should emit light with a predetermined luminance. Thus, when pattern photographing is conducted in such a manner that a large number of pixels are corresponding to one pixel for displaying on a display (as described above, oversampling of 8 times or more is preferable in the present invention), the extremely low luminance portion becomes a noise to vary the profile. Therefore, the values $H_{high}$, $H_{low}$, $V_{high}$, and $V_{low}$ of the CTF patterns cannot be adequately computed.

In contrast to this, according to the method using the moving average processing, the adverse effect of such noise can be eliminated so as to compute the values $H_{high}$, $H_{low}$, $V_{high}$, and $V_{low}$ of the CTF patterns with high precision to conduct the sharpness measurement with high precision.

When the moving average processing is conducted, similarly to the foregoing example, averaging in the V-direction is carried out with respect to the H-direction CTF pattern to obtain an H-direction (measurement direction) profile of the pattern. Next, the profile is subjected to the moving average processing in the H-direction to obtain the moving-average-processed profile. Further, the average value of relative maximum peaks and that of relative minimum peaks in the moving-average-processed profile are computed as the values $H_{high}$ and $H_{low}$, respectively.

Also with respect to the V-direction CTF pattern, averaging in the H-direction is similarly carried out to obtain a profile, the profile is subjected to the moving average processing in the V-direction, and the average value of relative maximum peaks and that of relative minimum peaks in the moving-average-processed profile are computed as the values $V_{high}$ and $V_{low}$, respectively.

In the present invention, when the moving average processing is conducted, it is preferable that the number of pixels N in which the averaging is to be conducted (filter size for averaging) is set to the number of pixels for photographing of the camera 14 (image pickup means) corresponding to one pixel for displaying on the display.

Further, the procedure of the moving average processing is not particularly limited, and therefore various measures are available. For example, with respect to the luminance data $x_i$ of m in number (i=1 to m) of a profile obtained by the averaging in a direction orthogonal to the sharpness measurement direction, a simple average $Y_i$ of N luminance data $x_i$ from the i-th to the [i+(N−1)]-th is computed [that is, $Y_i$=ave ($x_i$ to $x_{i+(N-1)}$)]. This computation is conducted for i=1 to (m−N+1) to obtain the moving-average-processed profile (the number of data is "m−N+1").

In the measuring system 10 of the present invention, when a profile is to be displayed using a graph or the like in the moving average processing, the profile after the moving average processing is preferably displayed.

After the values $H_{high}$, $H_{low}$, $V_{high}$, $V_{low}$, $A_{high}$, and $A_{low}$ are obtained in such a manner as described above, the H-direction CTF (H-direction CTF of Nyquist frequency) and the V-direction CTF are computed by the following equations, and the result is similarly outputted by displaying on a display and/or print outputting.

$$H - \text{direction } CTF = [(H_{high} - H_{low}) / (H_{high} + H_{low})] /$$
$$[(A_{high} - A_{low}) / (A_{high} + A_{low})].$$
$$V - \text{direction } CTF = [(V_{high} - V_{low}) / (V_{high} + V_{low})] /$$
$$[(A_{high} - A_{low}) / (A_{high} + A_{low})].$$

As is apparent from the above descriptions, according to the present invention, the image quality measurement of a display can be conducted after an optimum measurement condition is set as described above, utilizing a commercial image pickup device such as a digital camera without using a measuring device such as a microdensitometer. Consequently, the quality control of a display can be simply and adequately conducted even at a location of use so that, for example, in diagnosis using an electronic Schaukasten in a medical institution, an adequate diagnostic image is displayed to conduct an accurate diagnosis.

In the display image quality measuring system of the present invention, it is preferable that the same pattern (the same display image) is used for both the level adjustment pattern and the measurement pattern. In such a configuration, the number of patterns to be prepared can be reduced and the following effects can be obtained.

In the measuring system 10 as shown in FIG. 1A, the single PC 16 conducts pattern display on the display 12 and processing of photographing data obtained by the camera 14. Thus, there is no particular problem even when the two patterns are different from each other.

Figure 1B:
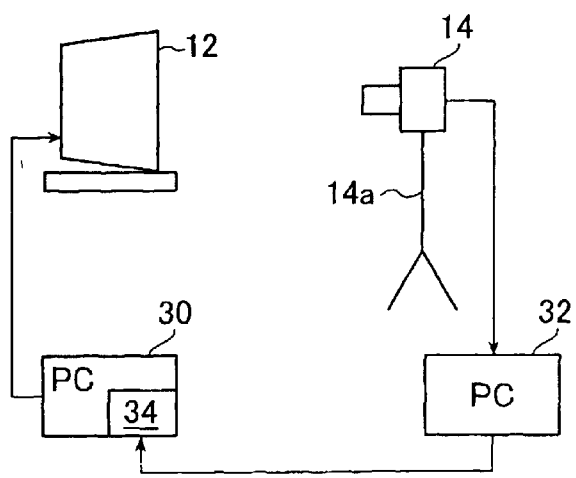

In contrast to this, in the system as shown in FIG. 1B, in which a PC 30 for instructing the display 12 to display a pattern and a PC 32 for processing photographing data obtained by the camera 14 are different from each other and an image quality measurement result processed by the PC 32 is transferred to a memory 34 for QC which is included in the PC 30, pattern display on the display 12 and photographing using the camera 14 cannot be linked, thereby reducing efficiency.

Even in such a system, however, when the same image is used for the level adjustment pattern and the measurement pattern, "prephotographing, determination of photographing condition, main photographing, and data processing" can be conducted in succession by the camera 14 and the PC 32 while the display 12 is kept in a state in which the pattern for level adjustment and measurement is displayed. Thus, image quality measurement of the display 12 can be conducted with satisfactory efficiency.

Here, in the graininess measurement, as described above, the same image is used for the level adjustment pattern and the measurement pattern so that there is no problem.

However, in the case of sharpness measurement, according to the above-mentioned examples, an image for the level adjustment pattern is different from that for the measurement pattern.

Thus, it is preferable in the sharpness measurement that such a pattern as shown in FIG. 5, in which the four images (patterns) as shown in FIGS. 4C to 4F, that is, the H-direction CTF pattern, the V-direction CTF pattern, the high luminance solid image, and the low luminance solid image, are arranged on one screen with the black background, is used as the level adjustment pattern and the measurement pattern (of course, it may also be used as either of the two patterns). In this case, prephotographing and determination of the photographing condition may be conducted using the high luminance solid image and the low luminance solid image in the pattern and then main photographing and sharpness measurement conducted using the four images as in the above case.

Here, in the case where a plurality of images as the measurement subjects (subjects for the acquisition of photographing data) are arranged on one screen of the display 12, it is necessary to arrange the respective images as shown in FIG. 5. In other words, the images should be arranged such that, when each of the images is extended in the H-direction and V-direction, the extended portions do not overlap another image as a measurement subject.

As has been known, in a CRT or an analog-connected LCD, tailing is caused in a main scanning direction (generally, H-direction) so that there is a case where an image which exists in the same direction is thus negatively influenced. In addition, in the LCD, there is a case where crosstalk is caused in the V-direction from a structural viewpoint so that there is similarly a case where an image is thus negatively influenced. Thus, when a plurality of images exist at the same positions in the V-direction and the H-direction, the influence of artifact is caused so that an adequate image cannot be displayed.

In contrast to this, when the above-mentioned pattern in which a plurality of images do not exist at the same positions in the V-direction and the H-direction is used, it is prevented that the respective images are influenced with each other so that the influence of artifact can be eliminated. Thus, high quality and adequate images are displayed as patterns for adjustment and measurement and high precision measurement can be conducted.

Further, when a plurality of images as the measurement subjects are arranged in a pattern, it is necessary to display all images within a photographing region of the camera 14 as a matter of course. In addition, when there is an image having a frequency component (in particular, a high frequency component), it is preferable that such an image is arranged in the central portion of the photographing region of the camera 14 and other images are arranged outside thereof.

In other words, in the example shown in the drawing, both the CTF patterns are arranged in the central portion of the photographing region and the low luminance and high luminance solid images are arranged outside thereof.

As has been known, lenses (imaging optical system) of the camera 14 have aberration. In general, the adverse effect of aberration can be almost neglected in the central portion. However, distortion and the like resulting from the aberration gradually become larger from the central portion toward an outer portion. In other words, the MTF (modulation transfer function) characteristic is more satisfactory in the central portion.

Therefore, when an image having a high frequency component, such as a CTF pattern is arranged in the central portion of the photographing region (vicinity of the optical axis of the camera 14), the adverse effect due to aberration is eliminated. Consequently, accurate photographing data can be obtained so that higher precision sharpness measurement and the like can be conducted.

Thus, the display image quality measuring method of the present invention has been described in detail. The present invention is not limited to the above embodiments, and various improvements and modifications may be made without departing from the gist of the present invention as a matter of course.

For example, according to the display image quality measuring method of the present invention, various display image quality measurements including measurement of artifact like tailing and measurement of luminance uniformity, in addition to the measurement of graininess and sharpness of the display, can be conducted.

Thus, as described in detail, according to the display image quality measuring system of the present invention, the user can simply and adequately measure the graininess and the sharpness of a display using a commercial image pickup device of a conventional type such as a digital camera by a user without using a measuring device such as a microdensitometer so that the quality control of the display is suitably conducted.

What is claimed is:

1. A display image quality measuring system comprising:
   image pickup means for conducting photographing which includes a two dimensional solid state sensor and an imaging optical system, with a photographing condition in which a gradation characteristic is not saturated, a gradation characteristic under the photographing condition, and a dark level being known;
   control means for instructing a display to display an adjustment pattern and a measurement pattern; and
   analyzing means for analyzing photographing data obtained by said image pickup means,
   wherein said display is instructed to display the adjustment pattern, the adjustment pattern thus displayed is photographed by said image pickup means, photographing data of the adjustment pattern is supplied to said analyzing means, and a measurement photographing condition is determined by said analyzing means using the photographing data, the photographing condition, the gradation characteristic, and the dark level, and wherein said display is instructed to display the measurement pattern, the measurement pattern thus displayed is photographed by said image pickup means under said determined measurement photographing condition, photographing data of the measurement pattern is supplied to said analyzing means, and the photographing data of the measurement pattern is analyzed by said analyzing means.

2. The display image quality measuring system according to claim 1, wherein said photographing data is corrected using said dark level, and when said photographing data is color photographing data, said photographing data is converted into monochrome photographing data and then determination of said measurement photographing condition and analysis of said photographing data are conducted.

3. The display image quality measuring system according to claim 1, wherein said image pickup means is a digital camera.

4. The display image quality measuring system according to claim 1, wherein parameters in said photographing condition are an exposure time, a diaphragm value, and photographing sensitivity.

5. The display image quality measuring system according to claim 1, wherein when sharpness of said display is measured, said display is instructed to display as said measurement pattern solid images of two kinds of luminance and high frequency images in which straight lines of said two kinds of luminance extending in a direction orthogonal to a sharpness measurement direction are alternately arranged for every K pixels (K is an integer of 1 or higher) in said measurement direction, photographing data of said high frequency images are averaged in the direction orthogonal to said measurement direction to compute a first profile of each of said high frequency images in said measurement direction, moving average processing is conducted for said first profile of each of said high frequency images to compute a second profile of each of said high frequency images, and said sharpness of said display is measured using average values of relative maximum peaks and average values of relative minimum peaks in the second profiles obtained by said moving average processing and average values of the photographing data of said solid images.

6. The display image quality measuring system according to claim 1, wherein said adjustment pattern and said measurement pattern are identical.

7. The display image quality measuring system according to claim 1, wherein when sharpness of said display is measured, in one or both of the adjustment pattern and the measurement pattern, a solid image of low luminance, a solid image of high luminance, a high frequency image in which a line of said high luminance and a line of said low luminance each extending in an H-direction are alternately arranged for every K pixels (K is an integer of 1 or higher) in a V-direction, and a high frequency image in which a line of said high luminance and a line of said low luminance each extending in the V-direction are alternately arranged for every K pixels (K is an integer of 1 or higher) in the H-direction are displayed on one screen, and said high frequency images are arranged in a central portion of a region to be photographed by said image pickup means, said solid images are arranged outside the central portion, and the respective images are arranged such that any of the images does not exist in a region of another image extended in the H-direction and the V-direction.

* * * * *